United States Patent
Kreutzkaemper et al.

(10) Patent No.: US 11,852,293 B2
(45) Date of Patent: Dec. 26, 2023

(54) LUBRICANT PUMPING SYSTEM

(71) Applicant: SKF LUBRICATION SYSTEMS GERMANY GMBH, Walldorf (DE)

(72) Inventors: Juergen Kreutzkaemper, Waibstadt-Daisbach (DE); Stefan Schuermann, Walldorf (DE); Andreas Schoenfeld, Sankt Leon-Rot (DE); Dieter Hess, Ludwigshafen (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 18 days.

(21) Appl. No.: 17/704,284

(22) Filed: Mar. 25, 2022

(65) Prior Publication Data

US 2022/0341543 A1    Oct. 27, 2022

(30) Foreign Application Priority Data

Apr. 26, 2021    (DE) .......................... 102021204102.7

(51) Int. Cl.
*F16N 13/22*    (2006.01)
*F04B 9/10*    (2006.01)
*F04B 15/02*    (2006.01)
*F04B 53/04*    (2006.01)
*F04B 53/16*    (2006.01)
*F16N 11/10*    (2006.01)
*F04B 49/10*    (2006.01)

(52) U.S. Cl.
CPC .............. *F16N 13/22* (2013.01); *F04B 9/10* (2013.01); *F04B 15/02* (2013.01); *F04B 49/10* (2013.01); *F04B 53/04* (2013.01); *F04B 53/16* (2013.01); *F16N 11/10* (2013.01); *F04B 2201/0208* (2013.01)

(58) Field of Classification Search
CPC ................. F04B 2201/0803; F04B 2201/0208
See application file for complete search history.

(56) References Cited

U.S. PATENT DOCUMENTS

| | | | | |
|---|---|---|---|---|
| 3,499,506 A * | 3/1970 | Reeve | ................... | F16N 27/005 |
| | | | | 222/335 |
| 3,730,297 A * | 5/1973 | Colgan | ................... | F16N 27/00 |
| | | | | 137/557 |
| 4,027,743 A * | 6/1977 | Deller | ..................... | F01M 5/00 |
| | | | | 184/6.4 |
| 4,800,367 A * | 1/1989 | Klintenstedt | ........... | F16N 29/04 |
| | | | | 73/866.2 |
| 6,398,509 B1 * | 6/2002 | Okazaki | .............. | F16C 33/6659 |
| | | | | 409/231 |
| 11,085,581 B2 * | 8/2021 | Hess | ....................... | F16N 31/00 |

(Continued)

FOREIGN PATENT DOCUMENTS

DE    102017221847 A1    6/2019

*Primary Examiner* — Michael A Riegelman
(74) *Attorney, Agent, or Firm* — J-TEK LAW PLLC; Scott T. Wakeman; Mark A. Ussai

(57) ABSTRACT

A lubricant pumping system includes a lubricant pump having a lubricant pumping space, a first seal configured to seal the lubricant pumping space, at least one signal detector, and a leakage detector for detecting leakage of a lubricant from the pumping space through the first seal and sending a signal to the signal detector in response to a detection of the leakage of the lubricant. The signal detector may produce a visual or acoustic output in response to receipt of the signal.

19 Claims, 3 Drawing Sheets

(56) References Cited

U.S. PATENT DOCUMENTS

| | | | |
|---|---|---|---|
| 2011/0046902 A1* | 2/2011 | Kyllingstad | F04B 51/00 |
| | | | 702/51 |
| 2013/0161130 A1* | 6/2013 | Alexander | F16N 13/14 |
| | | | 184/32 |
| 2014/0238742 A1* | 8/2014 | Borek | E21D 9/1093 |
| | | | 175/227 |
| 2014/0294633 A1* | 10/2014 | Brokenshire | F04B 49/10 |
| | | | 417/476 |
| 2018/0149461 A1* | 5/2018 | Hess | F16N 25/02 |
| 2018/0224011 A1* | 8/2018 | Mandera | F16N 13/10 |
| 2019/0170295 A1* | 6/2019 | Hess | F04B 49/10 |
| 2020/0318628 A1* | 10/2020 | Pilcher | F04B 53/22 |
| 2022/0341543 A1* | 10/2022 | Kreutzkaemper | F16N 13/02 |

\* cited by examiner

LUBRICANT PUMPING SYSTEM

CROSS-REFERENCE

This application claims priority to German patent application no. 10 2021 204 102.7 filed on Apr. 26, 2021, the contents of which are fully incorporated herein by reference.

TECHNOLOGICAL FIELD

The present disclosure relates to a lubricant pumping system configured to detect leakage from the system.

BACKGROUND

One of the most common types of fault in lubricant pumps is a leakage in the region of the pressurized parts, such as, for example, the seals. These leakages can impair the function of the lubricant pump and even cause a failure of the lubricant pump. In order to avoid consequential damage or even the failure of an entire system, it is desirable to detect a leakage early so that suitable measures can be taken to correct the leakage.

In order to detect leakages, relevant regions can be monitored at regular service intervals, for example, by the lubricant pump being tested for an escape of lubricant. However, when testing in this manner, the leakage may only be detected after the function of the lubricant pump has been impaired, so that a failure of the production process is often unavoidable. A shutdown of the lubricant pump in order to monitor the lubricant pump can also be unavoidable, for example, when an installation location of the lubricant pump lies in a dangerous region.

SUMMARY

It is therefore an aspect of the present disclosure to enable an early detection of leakages in lubricant pumps.

In the following a lubricant pumping system is disclosed that includes a lubricant pump having a lubricant pumping space and at least one seal. The lubricant pumping system further comprises at least one signal detecting device.

In order to detect leaks independently of visual checks and/or random observations, the lubricant pumping system furthermore comprises at least one leakage detecting device that is configured to detect a leakage of a lubricant from the pumping space of the lubricant pump through the at least one seal and to issue a signal to the signal detecting device when the leakage of the lubricant is detected.

In particular, the signal detecting device can further be configured to issue the signal. For example, the signal can be issued optically and/or acoustically. An optical notification can be, for example, a light indication, for example, an LED, or a display. In particular, the signal detecting device can be provided in the lubricant pump or separately from the lubricant pump, for example, in a control space. Furthermore, the generated signal can be transmitted via a cable and/or wirelessly to the signal detecting device. Furthermore, the signal detecting device can be configured to forward the received signal to a higher level control system and/or to a cloud storage.

With such a leakage detecting device, detecting leakages is no longer limited to service intervals or random observations. Furthermore, due to the early recognition it is possible to better prevent lubricant from getting into the environment, whereby threats such as, for example, a danger of slipping, for example, on machine platforms and/or hall floors, as well as fire risks, can also be reduced or prevented.

According to one exemplary embodiment, the at least one leakage detecting device comprises a determining device that is configured to determine a leakage extent. A "leakage extent" can be understood in particular to mean a measure of a degree or a severity of the leakage. For example, the leakage extent can indicate how much lubricant is passing from the pumping space of the lubricant pump through the at least one seal. In particular, by knowing the degree of leakage, it is possible to decide how severe the leakage is and whether it is necessary that measures be taken immediately for remedying the leakage or whether it is sufficient to remedy the leakage only during an upcoming maintenance. Unplanned outages and thereby increased production costs can thereby be prevented.

The determining device is preferably further configured to determine whether the leakage extent is greater than a prescribed first leakage extent and/or whether the leakage extent is greater than a prescribed second leakage extent, which is greater than the prescribed first leakage extent, wherein the at least one leakage detecting device is configured to issue a first signal when the determined leakage extent exceeds the first leakage extent and/or to issue a second signal when the determined leakage extent exceeds the second leakage extent. For example, the first prescribed leakage extent can correspond to a low leakage extent that serves as an advance warning. Furthermore, the second prescribed leakage extent can correspond to a leakage extent to which a timely action is necessary. An advance warning can thereby be made possible so that maintenance of the lubricant pump can be planned accordingly. Furthermore, the signal detecting device can be configured to output different responses to the first signal and the second signal.

According to a further preferred exemplary embodiment, a spatial region and/or a receiving region is provided on a side of the seal facing away from the pumping space, which spatial region and/or receiving region is configured to receive the escaped lubricant, wherein the leakage detecting device interacts with the spatial region and/or the receiving region and/or the seal in order to detect the leakage of the lubricant. For example, the determining device can be configured to detect a movement of a seal, in particular of a seal lip. Furthermore, the determining device can also be configured to measure a lubricant amount that is located in the spatial region and/or in the receiving region. Furthermore, the determining device can also be configured to detect a pressure, in particular a lubricant pressure, that is present in the spatial region and/or the receiving region. The determining device preferably detects the leakage extent using a capacitive sensor, an inductive sensor, an optical sensor, a mechanical sensor, a pressure sensor, a pressure switch, a weight sensor, a flow sensor, and/or a movement sensor. For example, the determining device can be configured such that a pin and/or piston is displaced by the escaping lubricant, wherein this displacement of the pin and/or piston is detected directly and/or indirectly by a capacitive sensor, an inductive sensor, and/or an optical sensor, for example, by the pin and/or piston moving a further element.

According to a further preferred embodiment, the lubricant pump further includes a leakage recovery device that is configured to guide the escaped lubricant into a further spatial region. The further spatial region is preferably a pumping space of the lubricant pump and/or a collection container, wherein in particular the collection container is provided in the lubricant pump or separately from the lubricant pump. A more efficient lubricant pump can thereby be provided, since the escaped lubricant can be either returned directly into the pumping space or collected in a collection container and subsequently processed and/or reused. This can further increase the reliability of the lubricant pump. In addition, it is possible to prevent in particular leakage lubricant from escaping into the environment, whereby fire risk and danger of slipping on machine platforms or hall floors is reduced.

In particular, the lubricant pump can be configured for a central lubrication system, in particular of an excavator.

According to another exemplary embodiment, a lubricant pumping system is disclosed that comprises a lubricant pump having a lubricant pumping space, a first seal configured to seal the lubricant pumping space and a leakage collection space on a side of the first seal opposite the pumping space that is located such that a leakage of a lubricant through the seal collects in the leakage collection space. The system also includes at least one signal detector, a pressure sensor configured to output a wired or wireless signal to the at least one signal detector indicative of a pressure in the leakage collection space and a pin extending through a housing of the lubricant pump that is connected to a piston configured to slide in response to an increase of pressure in the leakage collection space. The system also includes a leakage recovery pathway including a check valve, a first passage in the housing of the lubrication pump extending from the leakage collection space to the pressure sensor, and a second passage in the housing of the lubrication pump extending from the leakage collection space to the check valve. Optionally, the piston may be mounted in a third passage in fluid communication with the leakage collection space.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
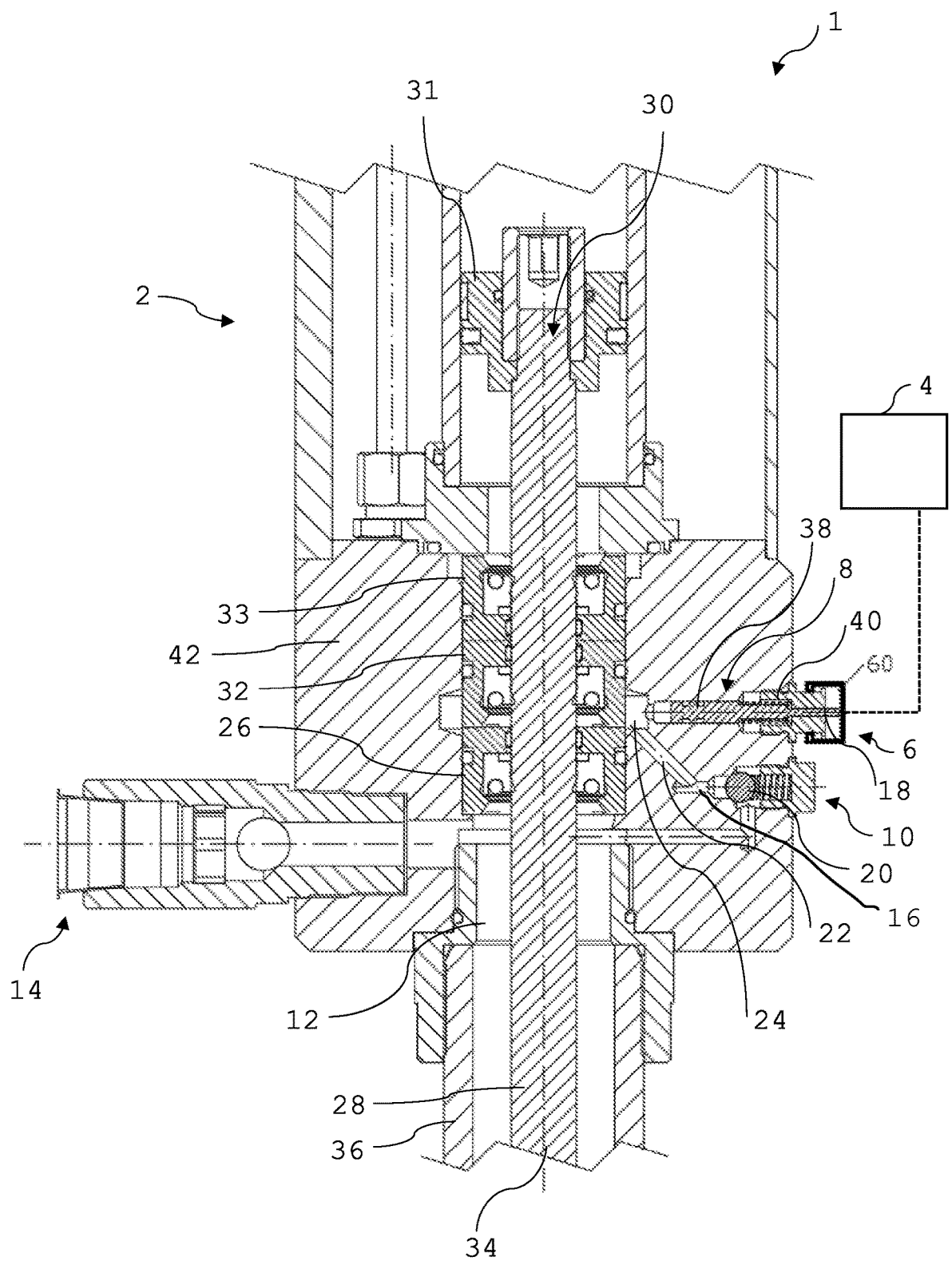
FIG. 1 is a schematic sectional view of a lubricant pumping system according to a first embodiment of the present disclosure.

FIG. 1 shows a lubricant pumping system 1 according to a first embodiment, including a lubricant pump 2 and a signal detecting device 4. Here the signal detecting device can be provided in the lubricant pump 2 itself, or separately from the lubricant pump 2, for example, in a control space or a cab. In FIG. 1 the lubricant pump is shown in axial section for better depiction. The lubricant pump 2 comprises an outlet 14 and a piston rod 28, which moves back and forth along its axial direction during an operating of the lubricant pump 2.

In a fully installed state a cylinder 31 is attached to an end 30 of the piston rod 28 such that the back-and-forth movement of the piston rod 28 can be brought about hydraulically. Alternatively other methods for moving the piston rod 28 are of course conceivable. A further cylinder (not shown) is attached at a region 34 of the piston rod 28, into which cylinder at least one check valve is introduced. Furthermore, the lubricant pump comprises a pumping space 12.

During an operating of the lubricant pump 2, the region 34 and the further cylinder move back and forth in a hollow cylinder 36 of the lubricant pump 2. A first end of the hollow cylinder faces the pumping space 12. A second end of the hollow cylinder 36 that lies opposite the first end is connected to a lubricant supply (not shown). If the piston rod 28 moves away from the lubricant supply, then the further cylinder sucks lubricant from the lubricant supply via an inlet valve (not shown) into the hollow cylinder 36. If the piston rod 28 then moves back onto the lubricant supply, then the inlet valve is closed, and the check valves on the further cylinder are open, so that the previously sucked-in lubricant reaches the pumping space 12. If the piston rod 28 subsequently moves back again from the lubricant supply, then the check valves in the further cylinder are closed, and the lubricant located in the pumping space 12 is pressed through the outlet 14 and through a valve located there.

At a region of the pumping space 12 that faces away from the lubricant supply, the piston rod 28 is sealed by a first seal 26 and a second seal 32. The second seal 32 is usually configured as a high-pressure seal. Furthermore, the first seal 26 can also be configured as a high-pressure seal. If the seal 26 leaks, leakage lubricant can reach into a spatial region 24 of the lubricant pump (which may be referred to as a "leakage collection space"), which spatial region 24 is disposed between the first seal 26 and the second seal 32. Furthermore, a third seal 33 is provided that is disposed on the side of the second seal 32 that is facing the end 30 of the piston rod 28. The third seal 33 can be configured in particular to seal against a medium, for example, a hydraulic oil, that is located in a region that is delimited by the cylinder 31.

In order to detect leakage through the first seal 26, the lubricant pumping system 1 furthermore comprises a leakage detecting device (leakage sensor) 6 that is configured to detect the leakage of the lubricant from the pumping space 12 of the lubricant pump 2. In addition, the leakage detecting device 6 is configured to issue a signal to the signal detecting device 4 when the leakage of the lubricant is detected. The generated signal can preferably be transmitted via a cable and/or wirelessly to the signal detection device 4.

Furthermore, the signal detecting device 4 is configured to issue an output signal in response to receiving the signal from the leakage detecting device 6. For this purpose the signal detecting device 4 can include an optical indication, such as, for example, a screen or an LED. Additionally or alternatively the signal detecting device 4 can be configured to issue an acoustic warning signal, for example, via a loudspeaker.

The leakage detecting device 6 comprises a determining device 8 that is configured to determine a leakage extent of the first seal 26. For this purpose the determining device 8 shown in FIG. 1 comprises a piston 38, at one end of which a pin 18 is attached, and a spiral spring 40, wherein the piston 38 is movably supported in a bore of a housing 42 of the lubricant pump, and the bore is connected to the spatial region. If lubricant now enters into the spatial region 24 due to a leakage of the first seal 26, the lubricant causes, in particular due to the pressure increase in the spatial region, a movement of the piston 38 along the bore, wherein the spiral spring 40 is simultaneously compressed and the pin 18 is pushed outward. The more the piston 38 is displaced, i.e., the more lubricant flows into the determining device 8, the further the pin 18 protrudes from the housing 42, whereby a fill-level can be detected from outside using a sensor 60. For example, the sensor 60 can detect a movement of the pin 18 optically, for example, via a photo diode that interacts with a light source and the shadowing caused by the pin 18. Additionally or alternatively the sensor can be an inductive sensor or a capacitive sensor that detects a change of position of the pin 18.

In addition, the lubricant pump 2 includes a leakage recovery device 10 that guides the leakage medium back into the pumping space 12. The leakage recovery device 10 comprises a receiving region 16 that is provided to receive leakage medium. The receiving region 16 is connected to the spatial region 24 by a channel 22 that is formed by a bore. If enough leakage medium accumulates in the spatial region 24 and the determining device 8, the leakage medium can be guided back into the pumping space 12 by a pressure relief valve 20. This return guiding is achieved in FIG. 1 by the spiral spring 40 of the determining device 8 exerting a force on the piston 38 that guides the leakage lubricant back into the pumping space 12 via the pressure relief valve 20. Alternatively or additionally the leakage recovery device 10 can include a check valve that couples the pumping space 12 and the receiving region 16. The lubricant that is pumped back into the pumping space 12 in this manner is subsequently pumped through the outlet 14.

Figure 2:
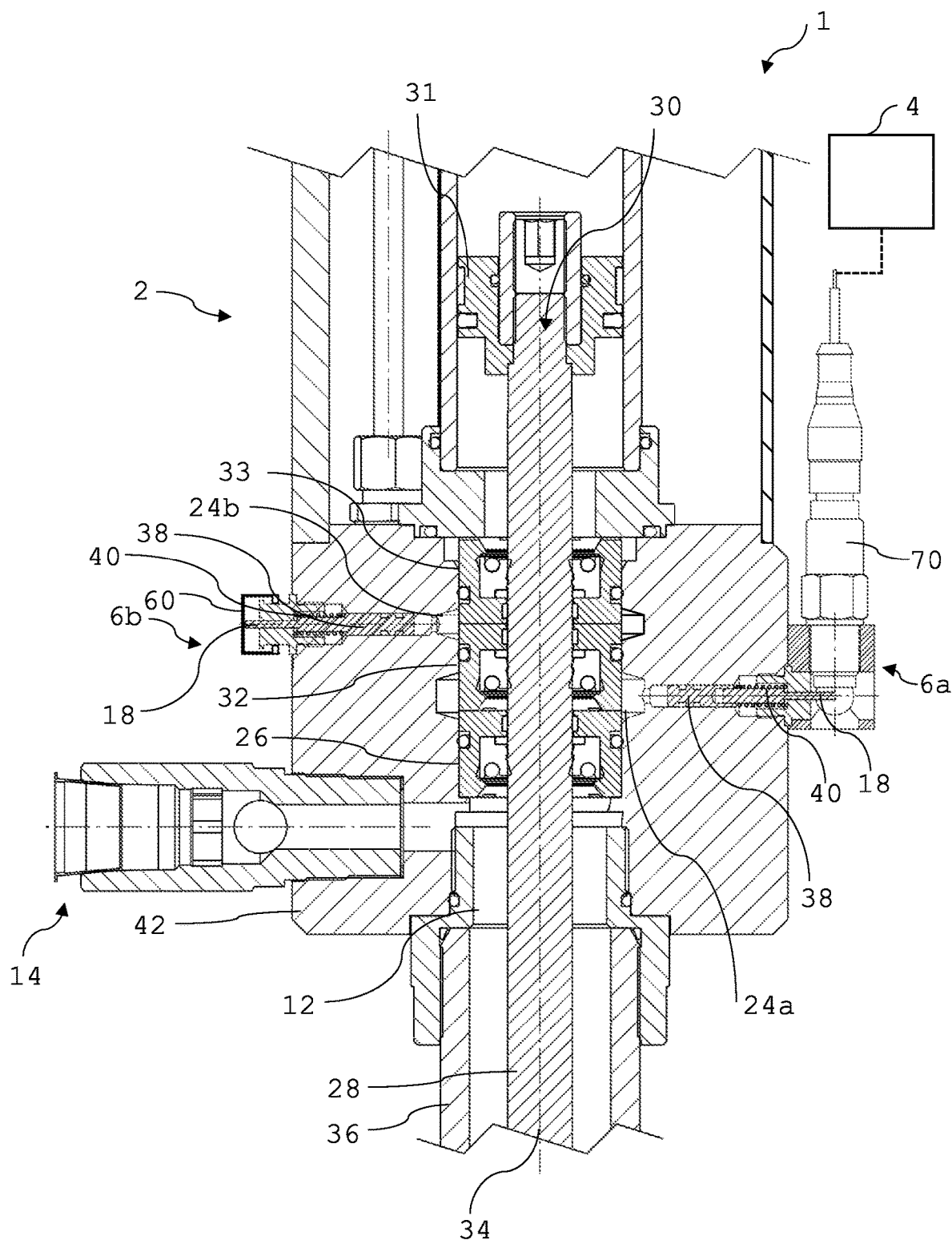
FIG. 2 is a schematic sectional view of a lubricant pumping system according to a second embodiment of the present disclosure.

FIG. 2 shows a lubricant pumping system 1 according to a second embodiment, including a lubricant pump 2 and a signal detecting device 4. The lubricant pump 2 of the lubricant pumping system 1 according to the second embodiment essentially corresponds to the lubricant pump 2 of the lubricant pumping system 1 according to the first embodiment. For this reason, in the following only the differences between the lubricant pumping system 1 of the first embodiment and the lubricant pumping system 1 of the second embodiment are addressed.

In FIG. 2 a first leakage detecting device 6*a* and a second leakage detecting device 6*b* are provided, wherein the second leakage detecting device 6*b* corresponds in its construction and its functioning to the leakage detecting device 6 of FIG. 1. However, in FIG. 2 the second leakage detecting device 6*b* is configured to monitor a spatial region 24*b* that is disposed between the second seal 32, which in FIG. 2 is configured as a double-acting seal, and the third seal 33. The second leakage detecting device 6*b* can thereby in particular detect a leakage of the medium contained in the region delimited by the cylinder 31, which medium can be, for example, a hydraulic oil.

Furthermore, the lubricant pump 2 in FIG. 2 does not include a leakage recovery device 10. The first leakage detecting device 6*a* also includes a pin 18 that protrudes from the housing 42 because of the escaping lubricant, as is described above. In addition, in FIG. 2 the leakage detecting device 6*a* comprises a proximity sensor as sensor 70 that is configured to detect the pin 18 protruding from the housing 42. In particular, the proximity sensor 70 is configured to determine how far the pin 18 protrudes from the housing 42. Furthermore, the determining device 8 is configured to determine whether the detected leakage extent is greater than a prescribed first leakage extent, and whether the detected leakage extent is greater than a prescribed second leakage extent, wherein the second leakage extent is greater than the first leakage extent. This can be detected, for example, by the proximity sensor 70 determining how far the pin 18 protrudes from the housing 42.

Furthermore, in FIG. 2 the leakage detecting device 6*a* is configured to issue a first signal to the signal detecting device 4 when the determined leakage extent exceeds the first leakage extent, and a second signal to the signal detecting device when the determined leakage extent exceeds the second leakage extent. In addition, the signal detecting device 4 can be configured to use different indications for the first and the second signal. For example, the first prescribed leakage extent can correspond to a low leakage extent that serves as an advance warning. Furthermore, the second prescribed leakage extent can correspond to a leakage extent wherein a timely action is necessary. The signal detecting device 4 can therefore also be configured to issue the first signal and the second signal differently. For example, in the case that the first signal has been transmitted to the signal detecting device 4, an optical indicator can be used for indicating receipt of the first signal, whereas in the case that the second signal has been transmitted to the signal detecting device 4, an acoustic warning signal can be issued in addition to the optical indication.

Figure 3:
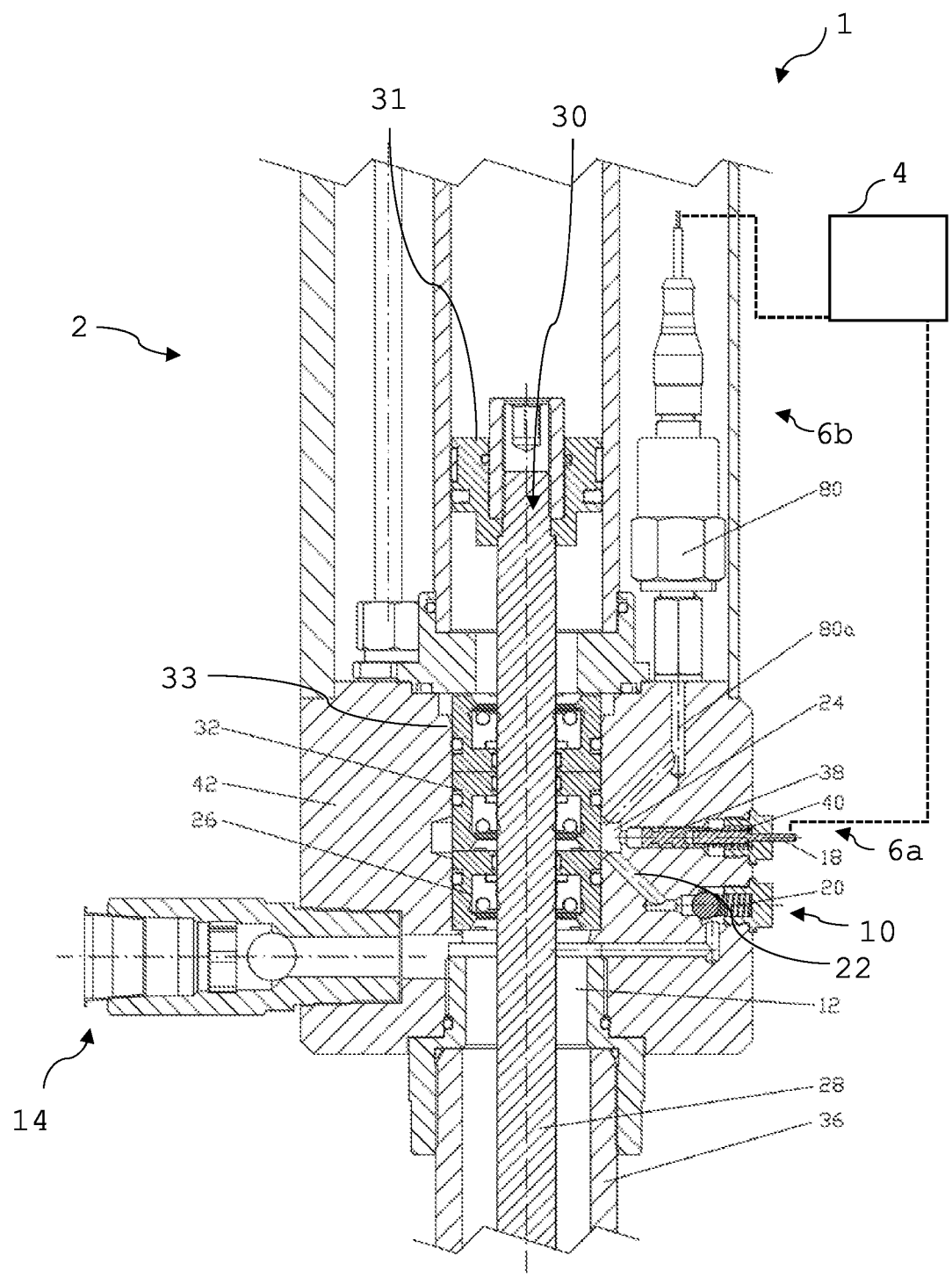
FIG. 3 is a schematic sectional view of a lubricant pumping system according to a third embodiment.

FIG. 3 shows a lubricant pumping system 1 according to a third embodiment, including a lubricant pump 2 and a signal detecting device 4. The lubricant pump 2 of the lubricant pumping system 1 according to the third embodiment essentially corresponds to the lubricant pump 2 of the lubricant pumping system 1 according to the first embodiment. For this reason, in the following only the differences between the lubricant pumping system 1 of the first embodiment and the lubricant pumping system 1 of the third embodiment are addressed.

In FIG. 3, two leakage detecting devices 6*a* and 6*b* are provided, wherein the leakage detecting device 6*a*, as with the lubricant pumping system 1 of FIG. 1, includes a pin 18 that protrudes from the housing because of the escaping lubricant, as is described above. Furthermore, a further channel 80*a* is provided in the housing 42, which further channel 80*a* is configured as a bore that extends from the spatial region 24. At the end of the channel 80*a* the second leakage detecting device 6*b* is disposed, which includes a sensor 80 as determining device, which sensor 80 is configured to determine a pressure in the channel 80*a* and in the spatial region 24. For example, the sensor can be a pressure switch that issues a signal as soon as a prescribed pressure value is exceeded, or a pressure sensor that issues the pressure value directly as signal. For example, a pressure sensor can issue a first signal when the prescribed first leakage extent is exceeded, and a second signal when the prescribed second leakage extent is exceeded. It is also possible to provide two or more sensors. For example, a first and a second pressure switch can be provided, wherein the first pressure switch issues a signal when the prescribed first leakage extent is exceeded, and the second pressure switch issues a signal when the prescribed second leakage extent is exceeded. Furthermore, it is also conceivable that both a pressure switch and a pressure sensor are provided.

In the embodiments shown in FIGS. 1 to 3, the leakage detecting devices 6, 6*a*, 6*b* interact with the spatial region 24, which is provided in the housing and is delimited by the first seal 26 and the second seal 32. However, it is also possible that the leakage detecting device directly interacts with a seal in order to detect the leakage of the lubricant. For example, the determining device can be configured to detect a movement of a seal, in particular a seal lip.

In summary, due to the presence of the leakage detecting device 6, a detecting of leakages is no longer limited to service intervals or random observations. Furthermore, due to the early recognition of leakages, lubricant can be better prevented from reaching the environment, whereby threats such as, for example, a danger of slipping, for example, on machine platforms and/or hall floors, as well as fire risks, can also be prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubricant pumping systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Lubricant pumping system
2 Lubricant pump
4 Signal detecting device
6 Leakage detecting device
8 Determining device
10 Leakage recovery device
12 Pumping space
16 Receiving region
18 Pin
20 Pressure relief valve
22 Channel
24 Spatial region
26 First seal
28 Piston rod
30 End
31 Cylinder
32 Second seal
33 Third seal
34 Region
36 Hollow cylinder
38 Piston
40 Spring
42 Housing
60 Sensor
70 Proximity sensor
80a Channel
80 Sensor

What is claimed is:

1. A lubricant pumping system comprising:
   a lubricant pump having a lubricant pumping space,
   a first seal configured to seal the lubricant pumping space,
   a leakage collection space on a side of the first seal opposite the pumping space, the leakage collection space being located such that a leakage of a lubricant through the seal collects in the leakage collection space,
   at least one signal detector, and
   a pressure sensor configured to output a wired or wireless signal to the at least one signal detector indicative of a pressure in the leakage collection space.

2. The lubricant pumping system according to claim 1, including an indicator pin configured to move in response to an increase in an amount of the lubricant in the leakage collection space.

3. The lubricant pumping system according claim 1, including leakage recovery means for guiding the lubricant from the leakage collection space into a return space.

4. The lubricant pumping system according to claim 3, wherein the leakage recovery means comprises a recovery space in fluid communication with the leakage collection space.

5. The lubricant pumping system according to claim 3, wherein the recovery space is the lubricant pumping space or a collection container.

6. The lubricant pumping system according to claim 1, wherein the signal detector is provided in the lubricant pump or separately from the lubricant pump.

7. The lubricant pumping system according to claim 1, wherein the lubricant pump is configured for a central lubrication system of an excavator.

8. The lubricant pumping system according to claim 1, including a slidable body configured to move in response to a pressure increase in the leakage collection space and a pin configured to move with the piston, a portion of the pin extending outside a housing of the lubricant pump.

9. The lubricant pumping system according to claim 8, including sensor means for determining a degree of movement of the pin.

10. The lubricant pumping system according to claim 9, wherein the at least one signal detector comprises circuitry for producing a leakage indicator signal in response to a receipt of a signal from the sensor means or a receipt of the wired or wireless signal from the pressure sensor.

11. The lubricant pumping system according to claim 10, wherein the wired or wireless signal has a first characteristic if a leakage extent is less than a predetermined value and a second characteristic is the leakage extent is greater than or equal to the predetermined value, and wherein the circuitry for producing the leakage indicator signal is configured to produce a leakage indicator signal if the signal has the first characteristic and a second leakage indicator signal different than the leakage indicator signal if the signal has the second characteristic.

12. The lubricant pumping system according to claim 11, wherein the first indicator signal is a visual or acoustic signal.

13. The lubricant pumping system according to claim 1, wherein the wired or wireless signal indicates a value of the pressure.

14. A lubricant pumping system comprising:
a lubricant pump having a lubricant pumping space,
a first seal configured to seal the lubricant pumping space,
at least one signal detector, and
leakage detecting means for detecting leakage of a lubricant from the pumping space through the first seal and sending a signal to the signal detector in response to a detection of the leakage of the lubricant,
wherein the leakage detecting means includes determining means for determining a leakage extent,
wherein the determining means is configured to determine whether the leakage extent is greater than a predetermined first leakage extent and whether the leakage extent is greater than a predetermined second leakage extent, the second leakage extent being greater than the first leakage extent, and
wherein the leakage detecting means is configured to generate a first signal when the determined leakage extent exceeds the first leakage extent, and to generate a second signal when the determined leakage extent exceeds the second leakage extent.

15. The lubricant pumping system according to claim 14, wherein the generated signal is transmissible via a cable and/or wirelessly to the signal detector.

16. The lubricant pumping system according to claim 14, wherein a leakage collection space is provided on a side of the seal opposite the pumping space, the leakage collection space being located such that the leakage of the lubricant through the seal collects in the leakage collection space, and
wherein the leakage detecting means monitors the leakage collection space to detect the leakage of the lubricant.

17. The lubricant pumping system according to claim 14, wherein the determining means includes a capacitive sensor, an inductive sensor, an optical sensor, a mechanical sensor, a pressure sensor, a pressure switch, a weight sensor, a flow sensor, and/or a movement sensor.

18. A lubricant pumping system comprising:
a lubricant pump having a lubricant pumping space,
a first seal configured to seal the lubricant pumping space,
a leakage collection space on a side of the first seal opposite the pumping space, the leakage collection space being located such that a leakage of a lubricant through the seal collects in the leakage collection space,
at least one signal detector,
a pressure sensor configured to output a wired or wireless signal to the at least one signal detector indicative of a pressure in the leakage collection space,
a pin extending through a housing of the lubricant pump, the pin being connected to a piston configured to slide in response to an increase of the pressure in the leakage collection space,
a leakage recovery pathway including a check valve,
a first passage in the housing of the lubrication pump extending from the leakage collection space to the pressure sensor, and
a second passage in the housing of the lubrication pump extending from the leakage collection space to the check valve.

19. The lubricant pumping system according to claim 18, wherein the piston is mounted in a third passage in fluid communication with the leakage collection space.

* * * * *